(12) United States Patent
Van Beurden et al.

(10) Patent No.: US 6,577,932 B1
(45) Date of Patent: Jun. 10, 2003

(54) SYSTEM FOR CONTROLLING A VESSEL

(75) Inventors: Eric Henricus Johannes Van Beurden, Tilburg (NL); Albert Frederik Wesselink, Wijk en Aalburg (NL)

(73) Assignee: Wärtsilä Propulsion Netherlands B.V., Drunen (NL)

( * ) Notice: Subject to any disclaimer, the term of this patent is extended or adjusted under 35 U.S.C. 154(b) by 0 days.

(21) Appl. No.: 09/787,298

(22) PCT Filed: Sep. 16, 1999

(86) PCT No.: PCT/NL99/00578
§ 371 (c)(1),
(2), (4) Date: Mar. 15, 2001

(87) PCT Pub. No.: WO00/15496
PCT Pub. Date: Mar. 23, 2000

(30) Foreign Application Priority Data

Sep. 16, 1998  (NL) ............................................. 1010112

(51) Int. Cl.⁷ ............................................. B60L 15/00
(52) U.S. Cl. .............................................. 701/21
(58) Field of Search ........................... 701/1, 9, 21, 99, 701/110, 111, 116, 117–123, 200–203, 205–207, 210–213, 300–302; 342/41, 357.06, 357.08, 454–455, 458, 461; 340/850–851, 438–439, 441, 465, 466–467, 471, 477, 825.36, 903, 965, 984–985, 987, 995, 988–991; 123/41.15, 319, 351, 363; 440/12.62, 84–87

(56) References Cited

U.S. PATENT DOCUMENTS

| 4,262,642 | A |   | 4/1981  | Sverdlin |
| 4,428,052 | A |   | 1/1984  | Robinson et al. |
| 4,590,909 | A | * | 5/1986  | Heintz .......................... 123/360 |
| 4,940,965 | A | * | 7/1990  | Umehara ...................... 340/460 |
| 5,056,411 | A | * | 10/1991 | Baker .......................... 89/41.07 |
| 5,362,263 | A |   | 11/1994 | Petty |
| 5,369,589 | A | * | 11/1994 | Steiner ......................... 340/990 |
| 5,667,033 | A | * | 9/1997  | Shimizu et al. ............. 180/169 |
| 5,754,429 | A | * | 5/1998  | Ishihara et al. ............. 340/958 |
| 5,884,213 | A | * | 3/1999  | Carlson .................. 114/144 A |
| 5,961,558 | A | * | 10/1999 | Kvamsdal ...................... 440/6 |

FOREIGN PATENT DOCUMENTS

DE       19654511       7/1998 ............. G05P/1/00

* cited by examiner

Primary Examiner—Thu Nguyen
(74) Attorney, Agent, or Firm—Handel & Morofsky

(57) ABSTRACT

System (10) for controlling a vessel, which vessel is provided with: propulsion means (40) for propelling the vessel, directional means for determining the direction in which the vessel is propelled, which system is provided with: speed regulating means (32, 36) for influencing the propulsion supplied by the propulsion means, steering means (30, 34) for influencing the directional means, at least one or more navigational aids (28) which provide those who are operating the speed regulating means and/or the steering means with data relating to the navigation, in which the system is provided with means by which the data (14, 16, 22, 24) coming from the navigational aid (28) is used to determine areas where the vessel must not go, and in which the speed regulating means or the steering means or both are provided with limiters (32, 36) by means of which the operation of the abovementioned means is rendered difficult if such operation would lead to the vessel moving in the direction of the abovementioned areas.

30 Claims, 4 Drawing Sheets

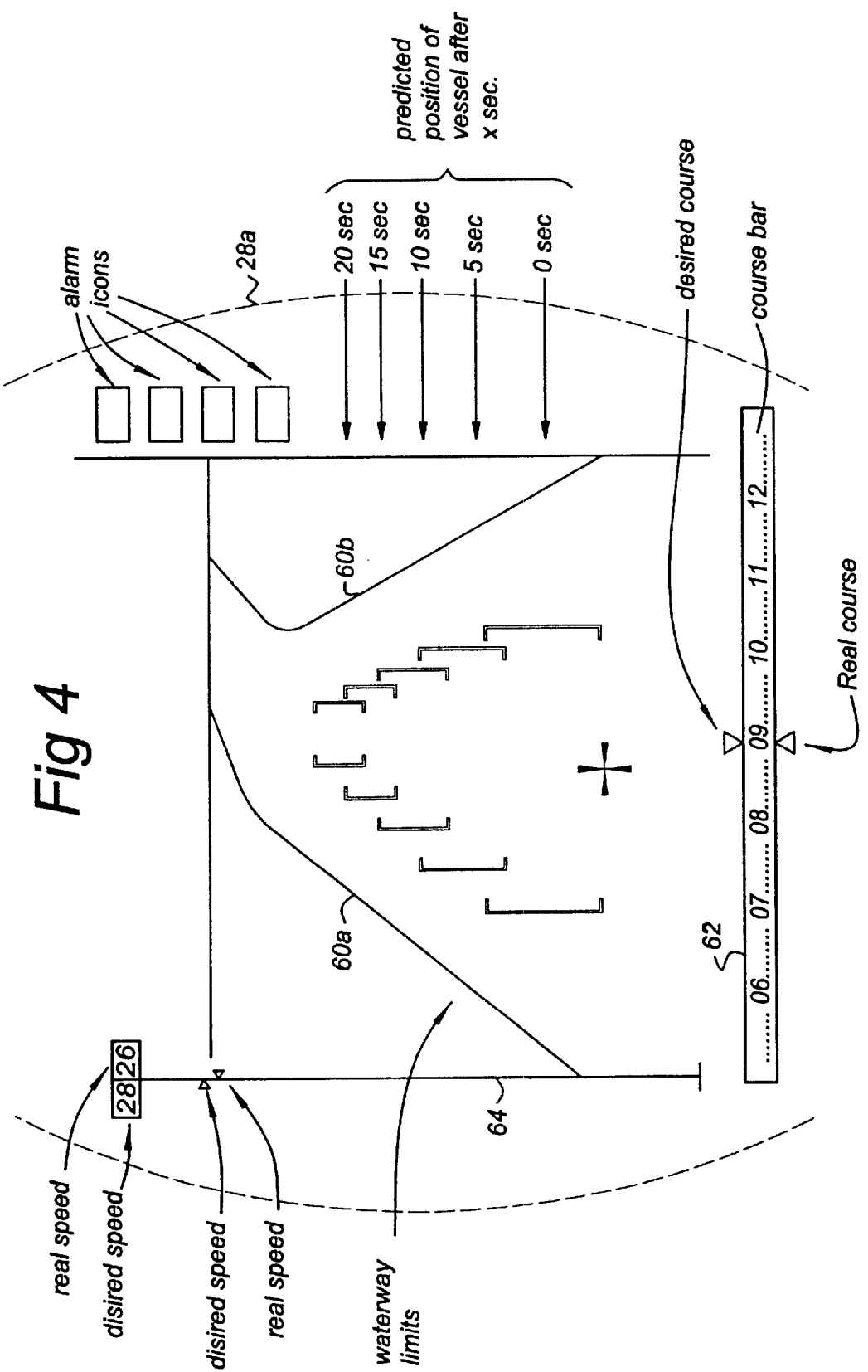

SYSTEM FOR CONTROLLING A VESSEL

BACKGROUND OF THE INVENTION

The invention relates to a system for controlling a vessel, which vessel is provided with:
- propulsion means for propelling the vessel,
- directional means for determining the direction in which the vessel is propelled, which system is provided with:
  - speed regulating means for influencing the propulsion supplied by the propulsion means,
  - steering means for influencing the directional means,
  - at least one or more navigational aids which provide those who are operating the speed regulating means and/or the steering means with data relating to the navigation.

The invention also relates to a system for controlling a vessel, which vessel is provided with:
- propulsion means for propelling the vessel,
- directional means for determining the direction in which the vessel is propelled, which system is provided with:
  - speed regulating means for influencing the propulsion supplied by the propulsion means,
  - steering means for influencing the directional means,
  - at least one or more sensors which provide information concerning the state of the propulsion means, for example number of revolutions, temperature, vibrations, position of the clutch (forward, neutral, reverse), oil level, cooling water pressure etc.

Such vessels are generally known and do not require any further explanation.

The propulsion means can be one or more azimuthal screw-propellers driven by one or more engines, one or more water jets driven by one or more engines, or other propulsion means known per se. The engines are, for example, internal combustion engines, such as gas turbines or diesel engines or electric motors etc.

The directional means can be formed by a rudder, but the direction of travel can often also be influenced by a nozzle of a water jet rotating about a vertical axis. All these and other means can be used within the scope of the invention.

The speed regulating means are often formed by a handle, a joystick, a slide control etc., by means of which an appropriate speed is set by moving an operating element to a particular position.

The steering means can be formed by a helm, a steering wheel, a joystick etc., by means of which an appropriate direction is set by moving an operating element to a particular position, In general, the operating means will be designed in such a way that said means can remain independently in a certain desired position, while movement to another position by, for example, a navigating officer can easily be carried out and does not require any great effort.

The navigational means can be a wide variety of different types of apparatuses. Known ones are radio navigation systems such as GPS, LORAN, DECCA etc., by means of which the geographical position of the vessel can be determined. Other known systems are radar systems by means of which a picture of the surrounding area can be obtained via a display, showing, inter alia, the position of other ships in the surrounding area relative to one's own vessel, but also the position of the coastline, the quayside, navigation channel marker buoys etc.

Other known means for determining position are electronic nautical charts (ECDIS system) and infrared and laser sensors for the detection of objects which are invisible to the radar system.

In addition, most vessels are equipped with sensors and meters for measuring and displaying the vessel's own speed and direction. This data can, for example, be displayed on a screen together with geographical map information which is stored on a suitable memory medium and can be used by a computer for displaying a chart of the immediate surroundings containing an indication of the position and the course of the vessel itself.

It is possible to combine the data obtained from various systems in a display by means of which a navigating officer is informed so well and in as much detail as possible concerning the current position and course of the vessel and its surroundings. Examples from the prior art can be found in CA-2154199, DE 3400602, DE-29619839, GB-2025722, EP-0319395, U.S. Pat. No. 4,428,052, U.S. Pat. No. 4,590,569 and U.S. Pat. No. 5,592,382.

Displays which require attention from the navigating officer are used in many of these known systems. While the navigating officer is concentrating on the display he cannot at the same time look outside and give attention to his surroundings. In order to eliminate this disadvantage, so-called head-up displays are already known, in which displays the windows through which the navigating officer looks out normally also serve as a projection screen. The navigating officer can then look out and at the same time observe information coming from the navigational equipment. Such head-up displays, which are suitable, inter alia, for nautical applications, are known from, for example, EP-0824216 and EP-0818701.

It is therefore possible to inform a navigating officer well, in each case in such a way that he can take the correct measures as regards course and speed for the purpose of safe navigation. Nevertheless, situations can arise in which the navigating officer for some reason or other takes a decision and correspondingly selects a speed or course which sooner or later is bound to lead to an undesirable or even dangerous situation.

It is also possible that the engine monitoring system may produce an alarm. In cases which are not so urgent such an alarm can be reacted to by, for example, lowering the propulsion speed, so that the engine in question does not have to supply so much power and can still remain in operation. In more serious forms of alarm it may be very desirable for one or more of the propulsion means to be stopped entirely. However, stopping one or more propulsion means can lead to more difficult or even totally impossible navigation. In such a case the crew will have to decide what should have priority: navigational safety or engine damage. In many cases, by limiting the propulsion power, it is still possible to guarantee navigational safety and possibly to limit the resulting damage.

BRIEF SUMMARY OF THE INVENTION

The object of the invention is then to indicate the way in which a known system can be modified in such a way that, starting from the current situation (engine state and position), travelling on a course and/or at a speed which is likely to lead to undesirable or dangerous situations is prevented or rendered difficult.

This object is achieved according to the invention by a system for controlling a vessel, which vessel is provided with:
- propulsion means for propelling the vessel,
- directional means for determining the direction in which the vessel is propelled, which system is provided with:
  - speed regulating means for influencing the propulsion supplied by the propulsion means, steering means for influencing the directional means,
at least one or more navigational aids which provide those who are operating the speed regulating means and/or the steering means with data relating to the navigation,
characterized in that
the system is provided with means by which the data coming from the navigational means is used to determine areas where the vessel must not go, and in that
the speed regulating means or the steering means or both are provided with limiters by means of which the operation of the abovementioned means is rendered difficult if such operation would lead to the vessel moving in the direction of the abovementioned areas.

In this embodiment of the system special attention is paid to the course and the speed of the vessel. The object of the invention can also be achieved by a system for controlling a vessel, which vessel is provided with:

propulsion means for propelling the vessel,
directional means for determining the direction in which the vessel is propelled, which system is provided with:
speed regulating means for influencing the propulsion supplied by the propulsion means,
steering means for influencing the directional means,
at least one or more sensors which provide information concerning the state of the propulsion means, for example number of revolutions, temperature, vibrations, position of the clutch (forward, neutral, reverse), oil level, cooling water pressure etc.
characterized in that
the system is provided with means by which) on the basis of the data coming from the abovementioned sensors, the operating conditions which the propulsion means must not reach are determined
the speed regulating means or the steering means or both are provided with limiters by means of which the operation of the abovementioned means is rendered difficult if such operation would lead to the propulsion means reaching the abovementioned operating conditions.

In this embodiment attention is paid in particular to the operating states of the propulsion means.

It will be clear that the invention can also be achieved by a system for controlling a vessel, which vessel is provided with propulsion means for propelling the vessel,
directional means for determining the direction in which the vessel is propelled, which system is provided with:
speed regulating means for influencing the propulsion supplied by the propulsion means,
steering means for influencing the directional means,
at least one or more navigational aids which provide those who are operating the speed regulating means and/or the steering means with data relating to the navigation,
at least one or more sensors which provide information concerning the state of the propulsion means, for example number of revolutions, temperature, vibrations, position of the clutch (forward, neutral, reverse), oil level, cooling water pressure etc.
characterized in that
the system is provided with means by which the data coming from the navigational means is used to determine areas where the vessel must not go, and in that
the system is provided with means by which, on the basis of the data coming from the abovementioned sensors, the operating conditions which the propulsion means must not reach are determined
the speed regulating means or the steering means or both are provided with limiters by which the operation of the abovementioned means is rendered difficult if such operation would lead to the vessel moving in the direction of the abovementioned areas and/or if the propulsion means reach the abovementioned operating conditions.

In this combined embodiment account is taken of not only the course and the position of the vessel, but also the operating states of the propulsion means.

The fact that the operation of the various course-determining and/or speed-determining means is rendered difficult or even impossible remakes clear to the navigating officer that his decision to travel on a certain course/at a certain speed was not (or not entirely) correct.

In a preferred embodiment the limiters ensure that the displacement, turning or other movement of the speed regulating means and/or the steering means past certain positions is partially impeded, so that the operative has to exert more force than normally. It remains possible in this embodiment to travel on an undesirable course/at an undesirable speed, but the navigating officer is clearly informed about the undesirability by the fact that it takes a great deal of effort to move the operating means into the corresponding position.

In another embodiment the limiters ensure that the displacement, turning or other movement of the speed regulating means and/or the steering means past certain positions is blocked. In this embodiment the navigating officer cannot therefore set some courses or speeds if the navigational means consider this undesirable. In order to ensure that it is still possible to intervene in exceptional cases, it is preferable to be able to switch off this mode.

It is also preferable if the means used to determine areas from the data coming from the navigational means into which the vessel must not go are provided with a display, by means of which the reasons for this decision are displayed in one way or another.

BRIEF DESCRIPTION OF THE SEVERAL VIEWS OF THE DRAWINGS

The invention will be explained in greater detail below with reference to the appended figures.

FIG. 4 shows the way in which the necessary data can be presented to a navigating officer of the vessel.

DETAILED DESCRIPTION OF THE INVENTION

Figure 1:
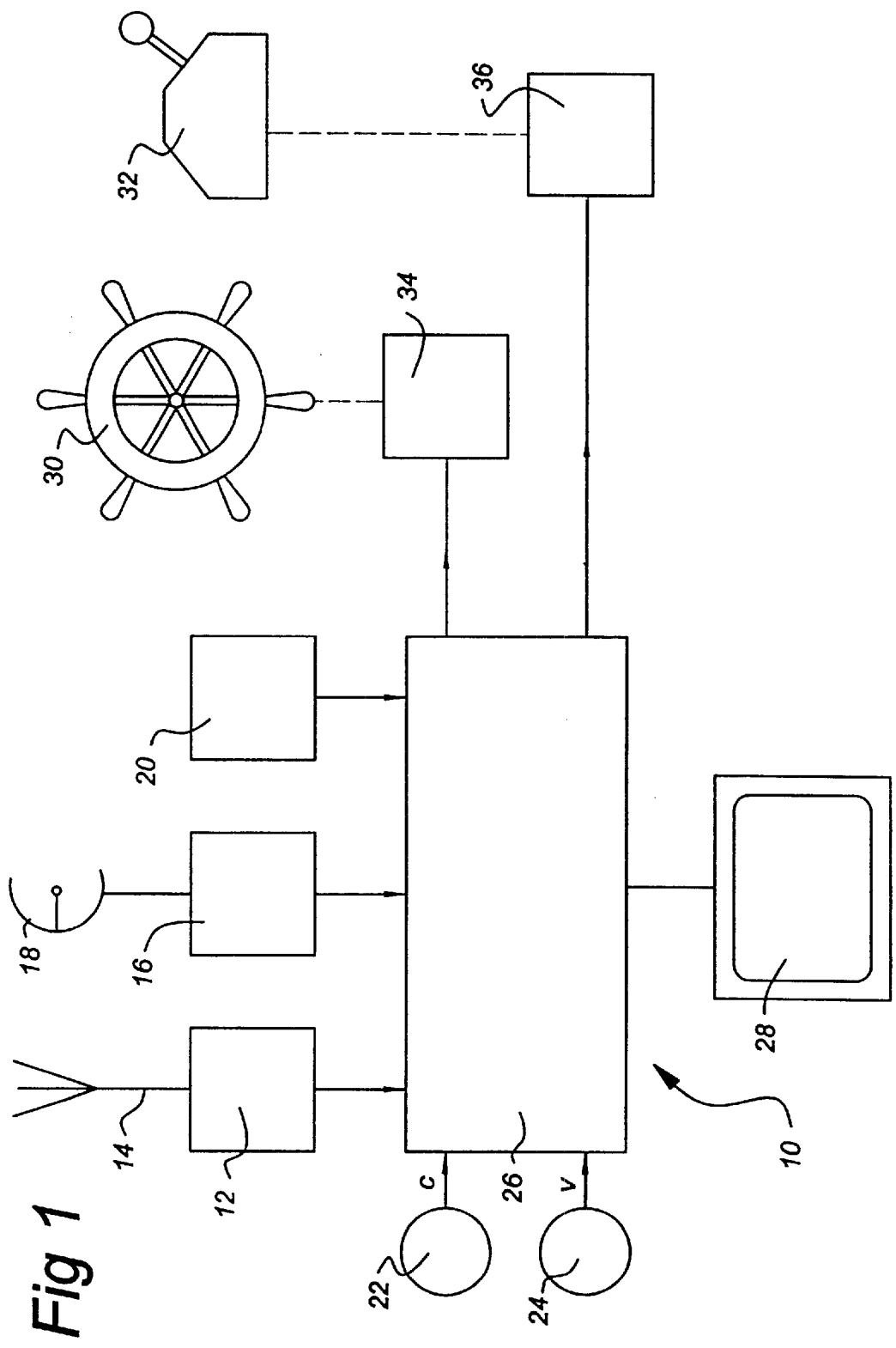
FIG. 1 shows diagrammatically a first embodiment of a system according to the invention.

FIG. 1 shows diagrammatically a system according to the invention.

The system in FIG. 1, in its entirety indicated by 10, is provided with a number of navigational instruments. The receiver 12 with antenna 14 stands symbolically for, for example, a LOREAN receiver, a DECCA receiver or a GPS receiver, or a combination of the above. The receiver 16 with antenna 18 stands symbolically for a radio receiver of which various types are known. Reference numeral 20 indicates a computer, in which, for example, geographical map information is stored. Reference numeral 22 indicates a sensor by means of which course information c is provided. Such a sensor can be, for example, a compass which is designed in such a way that the compass can deliver electronic data corresponding to the course. Reference numeral 24 shows a sensor which measures the speed v of the vessel. Such speed sensors, by means of which digital electrical signals are delivered, are known per se.

All the abovementioned sensors and systems supply electrical signals to a central processor 26, which processes all these signals and as a result of them displays a chart on the diagrammatically indicated display screen 28, showing the position of one's own vessel, the positions of vessels in the surrounding area, the positions of buoys in the surrounding area, the position of any coastline, quay line or the like, and any depth lines and the like.

Systems in which the components described so far are used in combination are already known, and examples of them are described in the patents mentioned earlier.

As also already indicated, it is known to use a head-up display instead of a normal display screen 28, by means of which head-up display the necessary information is projected onto the pane or the window through which the navigating officer normally looks out during the navigation of the vessel. This ensures that the navigating officer can observe not only the actual outside world, but also the projected information without having to direct his attention specially to one of the two, and therefore not being able to devote attention to the other.

Despite all the information provided and despite all the expertise of the navigating officer, it can still happen that the latter takes a decision which sooner or later may take the vessel into a dangerous position. In order to avoid this, a number of measures are taken in the system according to the invention.

First, the processor 26 is designed in such a way that it can calculate from the available information which geographical areas are out of bounds for the vessel, in other words, into which geographical areas the vessel definitely must not go.

The processor 26 is also designed in such a way that for each course it can establish what speed is permissible on the course in question. Speed restrictions can arise, for example, by the fact that they are imposed from the outside by the authorities concerned, but can also arise from the fact that, for example, in relatively shallow water too high a speed is undesirable because there might be a chance of damage to the screw-propeller, the screw-propeller shaft and the like.

The navigating officer has at his disposal on board the vessel a number of operating means with which influence can be exerted upon course and speed of the vessel. Diagrammatically, these operating means are indicated by means of a steering wheel 30, by means of which the course of the vessel can be changed, and the handle 32, by means of which the speed, on the one hand, and the direction (forward/backward), on the other, of the vessel can be influenced. It will be clear that the means 30 and 32 only stand symbolically for a large series of differently designed means, such as joysticks, slide controls, touch sensors and other fully mechanical, fully electronic or half-and-half operating means. All these means are assumed to be known per se, The means 30 and 32 are connected to limiter elements 34 and 36. So long as the ship is travelling on a course on which it cannot go into an area which is indicated as forbidden by the processor 26, the limiter 34 is out of action. In a similar way the limiter 34 is out of action so long as the ship is travelling at a speed, forward or backward, which lies within the speed range permitted by the processor 26.

However, as soon as the navigating officer wishes to operate the steering wheel 30 in such a way that the ship goes onto a course which does lead to an area forbidden by the processor 26, the limiter 34 will go into action. This limiter will ensure that the operation of the steering wheel 30 is rendered particularly difficult, for example by the fact that about the shaft of the steering wheel a brake which renders the turning of the steering wheel in the direction concerned difficult or impossible goes into action.

However, turning in the opposite direction to a course which does not produce any danger whatsoever remains possible in the ordinary way without any restriction.

In a similar way the limiter unit 36 prevents the speed regulator 32 from being set at a speed which for some reason or other momentarily falls outside a permitted range of speeds. As soon as the handle 32 is moved to too high (or possibly even too low) speed, the limiter 36 will go into action and render this movement of the handle 32 difficult or block it completely.

Figure 2:
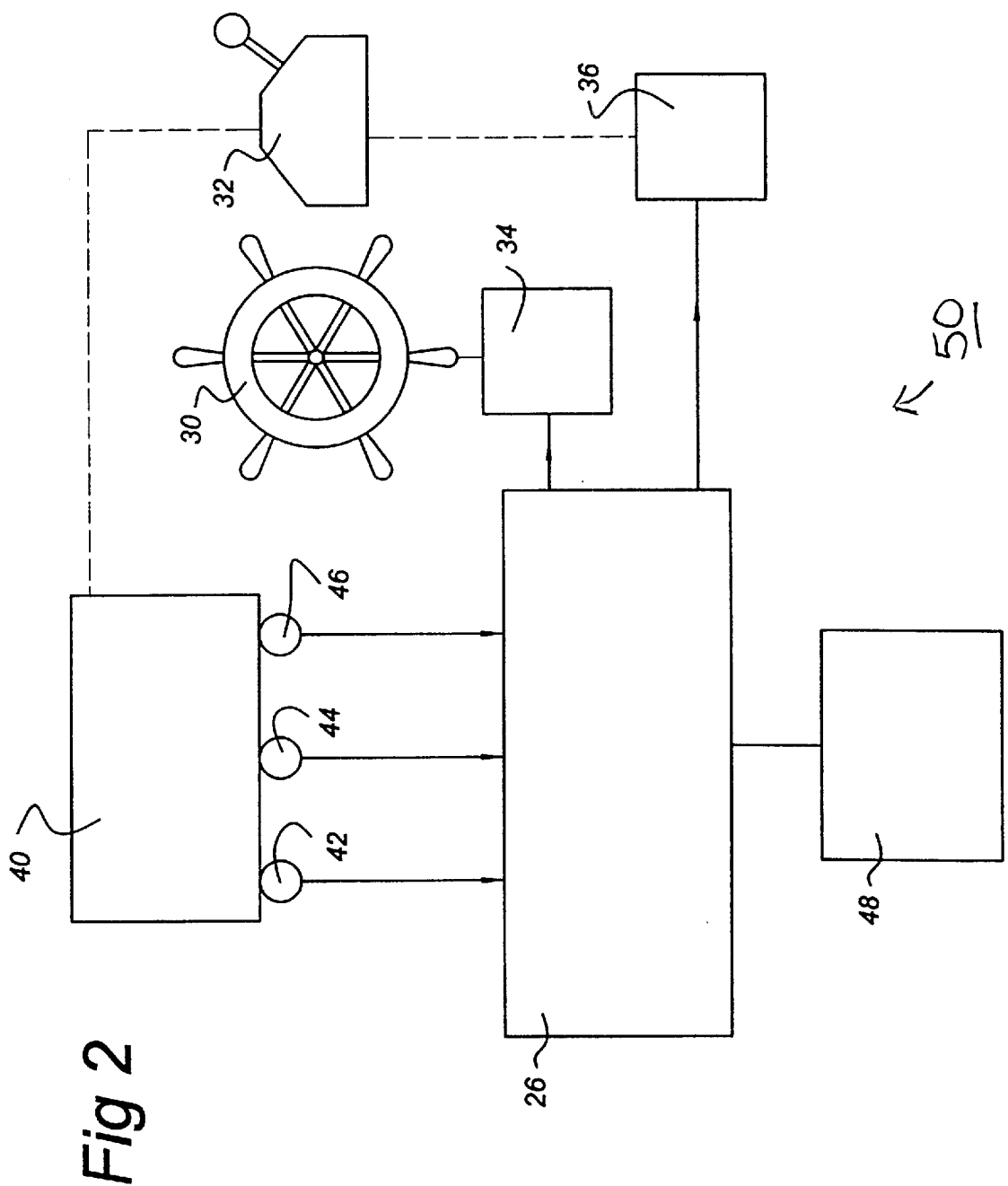
FIG. 2 shows diagrammatically a second embodiment of a system according to the invention.

FIG. 2 shows another embodiment of the system according to the invention, in its entirety indicated by 50. In this embodiment also, the navigating officer has at his disposal on board the vessel a number of operating means with which influence can be exerted on course and speed of the vessel. As in FIG. 1, these means are indicated diagrammatically by means of a steering wheel 30, by means of which the course c of the vessel can be changed, and the handle 32, by means of which the speed v, on the one hand, and the direction (forward/backward), on the other, of the vessel can be influenced. Here again, these means are only diagrammatic for a large number of other means, which can replace them. The means 30 and 32 are connected to limiter elements 34 and 36.

The figure also shows the propulsion means 40 of the vessel separately in diagrammatic form. These propulsion means can be provided with a drive engine, a clutch and a screw-propeller or a drive engine combined with a pump, or several drive engines combined with several pumps or screw-propellers. Any conceivable known propulsion unit can be inserted within the framework 40. As indicated diagrammatically in FIG. 2, the propulsion means are provided with a number of sensors for measuring the operating conditions of the propulsion means. Diagrammatically indicated are the sensors 42, 44 and 46, by means of which the number of revolutions of the engine, the number of revolutions of the driven shaft to the screw-propeller, the number of revolutions of the pump, the temperature of the cooling water, the temperature of the oil, the frequency or frequencies of the vibrations produced by the propulsion means, the position of the clutch (forward, neutral, reverse), the oil level, the cooling water pressure etc. All these abovementioned sensors and also many sensors not mentioned are known per se to the expert in this field. These sensors deliver signals to the processor 26, which on the basis of suitable software processes these signals and calculates from them whether the propulsion unit 40 is within desirable operating conditions. If the temperature of the oil, for example, rises too high, then measures will have to be taken, for example lowering the number of revolutions, increasing the speed at which the oil is pumped through a cooler etc. If the number of vibrations of the engine increases, it may be desirable to increase or reduce the number of revolutions, in such a way that the number of vibrations is reduced. If the operating means 30 and 32 are now operated in such a way that the propulsion means 40 could reach undesirable operating conditions, then the limiters 34 and/or 36 go into action, thereby making the relevant operation of the means 30 and 32 difficult. If the navigating officer wishes, for example, to increase the number of revolutions by operating the handle 32, and in the meantime it is known in the processor 26 that this will cause the vibration amplitude of the propulsion unit to increase sharply, which is undesirable, then the processor 26 can activate the unit 36, with the result that the operation concerned is rendered difficult or is impeded. The reason for impeding the operation can be displayed on a display 48.

Figure 3:
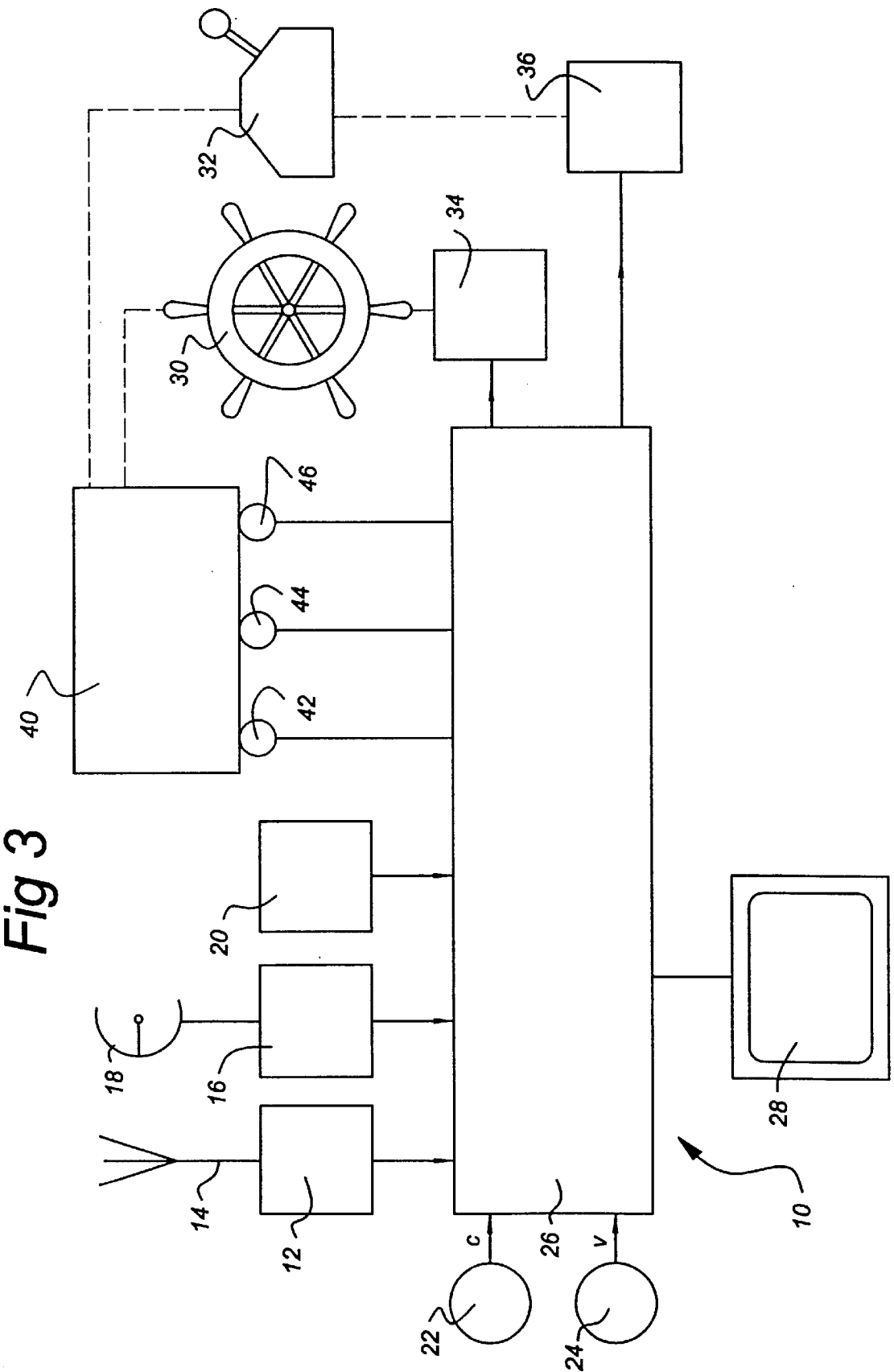
FIG. 3 shows a combined embodiment of a system according to the invention.

An extended embodiment of the system, in which the features of the systems from FIGS. 1 and 2 are combined, is shown diagrammatically in FIG. 3. In FIG. 3 the components which also appear in FIGS. 1 and/or 2 are indicated by the same reference numerals. In this figure it is also indicated that, depending on the embodiment of the propulsion means and the direction-determining means, a clutch can also be present between the steering wheel 30 and the unit 40. In FIG. 3 the propulsion direction, propulsion speed and the operating conditions of the propulsion means and possibly the direction-determining means are taken into account by the processor 26, which on the basis thereof gives instructions to the limiting means 34 and 36, in such a way that the navigating officer (or other operative) cannot operate the means 30 and 32 in such a way that the vessel can go into an undesirable situation.

It will be clear that the processors 26, on the basis of all the input data, must be capable of providing the navigating officer with extensive data by way of the display unit 28. A possible display of this data is shown in FIG. 4. The limit of the display unit 28 is indicated by 28a in FIG. 4. Within this boundary a demarcated part is reserved in the central part of the display screen for showing the actual situation of the ship and also a number of predicted situations in the near future with respect to the surrounding area of the ship. It is assumed in FIG. 4 that the ship is on a waterway which has a boundary on both sides. These left and right boundaries are shown in FIG. 4, indicated by 60a and 60b. Such boundaries can be formed not only by banks, dikes and other waterway-bounding components, but can also be formed by, for example, local shallow areas, sandbanks, submerged rocks and the like. The data resulting in the display of the lines 60a and 60b can come from an electronic chart stored in the processor 26, or stored in a unit to which the processor 26 is linked.

Between the boundaries 60a and 60b a number of position frames are shown, indicating the position of the vessel at the current moment and also at a number of moments in the near future. As indicated on the right-hand side, the position in this case is shown at time zero (the current position of the vessel) and also in the future after 5 seconds, 10 seconds, 15 seconds and 20 seconds. The position frames are also displayed in such a way that account is taken of a previously set perspective. The result of this is that the frames together indicate a path which is more clearly visible for the navigating officer, from which it emerges in the present case that until in any case after 20 seconds in the future this path lies fully within the boundaries formed by the banks 60a and 60b of the assumed waterway.

At the bottom of the central display part is the course bar 62, on which course indications, for example in the form of degrees or something similar are displayed. At the bottom there is an arrow which indicates the actual course on the course bar, while at the top there is an arrow provided for indicating the desired course, calculated by the processor 26. In the present case desired course and actual course coincide, and the navigating officer therefore does not need to take any measure at all. However, as soon as the actual course and the desired course differ from each other, this gives the navigating officer an indication that the course should possibly be adjusted.

On the left-hand side there is a speed bar 64. This bar begins at the bottom at a speed of zero, and as you climb higher along the bar, the bar represents a higher speed. Two arrows are provided along the bar, one for the desired speed, and one for the actual speed. At the top of the bar the actual speed and the desired speed are shown in a manner which is easy to interpret, for example in kilometres per hour, miles per hour, or in another desired unit. As can be seen in the example of FIG. 1 the actual speed is 26, and the desired speed is 28. The navigating officer can deduce from this that he may consider measures for increasing the speed.

Finally, a number of alarm icons are provided on the right-hand side, by means of which icons alarm situations can be indicated in a manner which can be understood by the navigating officer.

What is claimed is:

1. A control system for controlling a waterborne vessel, the waterborne vessel having:
   a) a propulsion unit for propelling the waterborne vessel through the water; and
   b) a directional device for determining a direction of travel of the waterborne vessel is propelled;
      wherein the control system comprises:
      i) a manually operable speed regulator to regulate the propulsion supplied by the propulsion unit;
      ii) a manually operable steering unit operable to influence the directional device;
      iv) at least one limiter to impede the manual operation of the speed regulator or the steering unit or both the speed regulator and the steering unit; and
      v) at least one navigational aid to provide navigation data to an operator of the speed regulator or the steering unit or of both the speed regulator and the steering unit;
      and wherein the control system can process the navigation data to identify forbidden areas of travel for the waterborne vessel and actuate one or more of said at least one limiters to impede operation of the speed regulator or of the steering unit or of both the speed regulator and the steering unit that would lead to the waterborne vessel moving toward the forbidden areas.

2. A control system according claim 1 wherein the speed regulator and the steering unit are each manually movable and wherein the limiters are operable so that movement of the speed regulator or the steering unit or of both the speed regulator and the steering unit past certain respective positions is partially impeded so that the operator has to exert more force than normal.

3. A control system according claim 1 wherein the limiters are operable so that movement of the speed regulator or of the steering unit or of both the speed regulator and the steering unit past certain positions leads to more or less vibration of the speed regulator or of the steering unit or of both the speed regulator and the steering unit.

4. A control system according to claim 1 wherein the speed regulator and the steering unit are each manually movable and wherein the limiters are operable so that movement of the speed regulator or the steering unit or of both the speed regulator and the steering unit past certain respective positions is blocked.

5. A control system according to claim 1 wherein the navigational aid comprises a display to display to the operator reasons for determining the forbidden areas.

6. A control system according to claim 1 wherein the navigation aid comprises a display screen to display the surroundings of the waterborne vessel panoramically from a viewpoint above the water level and wherein the forbidden areas, a current position and a future position of the waterborne vessel are indicated in the display of the vessel surroundings.

7. A control system according to claim 6 wherein multiple time-sequenced future vessel positions are indicated in the display of the vessel surroundings.

8. A control system according to claim 6 wherein each waterborne vessel position is indicated by a ship symbol comprising a framework having lateral dimensions corresponding to the breadth of the ship account being taken of the panoramic perspective, while the position of the ship symbol in the display corresponds to the position of the bow of the ship in the surroundings displayed.

9. A control system according to claim 8 wherein the framework comprises two vertical line sections, the distance between the vertical line sections being related to the breadth of the ship.

10. A control system according to claim 9 wherein the top or the bottom or the top and the bottom of each of the vertical line sections connects or connect to a horizontal line section extending toward the other vertical line section in each case.

11. A control system according to claim 6 wherein the display comprises a bar indicating both the actual course of travel and a desired course of travel in suitable units.

12. A control system according to claim 6 wherein the display comprises icons to display alarm signals.

13. A control system according to claim 6 wherein the forbidden areas are displayed on the display screen in a color or colors differing from the color or colors of the remaining areas.

14. A control system according to claim 6 wherein the navigation data is selected from the group consisting of radio navigation data, data output by GPS, LORAN or a DECCA system, geographical position data, radar imaging data, electronic nautical chart data, infra red sensor data, laser sensor data and combinations of any two or more of the foregoing.

15. A control system for controlling a waterborne vessel, the waterborne vessel having:
 a) a propulsion unit for propelling the waterborne vessel through the water; and
 b) a directional device for determining a direction of travel of the waterborne vessel is propelled;
 wherein the control system comprises:
  i) a manually operable speed regulator to regulate the propulsion supplied by the propulsion unit;
  ii) a manually operable steering unit operable to influence the directional device;
  iii) at least one propulsion unit sensor to provide information concerning the state of the propulsion unit; and
  iv) at least one limiter to impede the manual operation of the speed regulator or the steering unit or both the speed regulator and the steering unit;
 and wherein the control system can process the sensor information to determine undesirable propulsion unit operating conditions and to actuate one or more of said at least one limiters to impede operation of the speed regulator or of the steering unit or of both the speed regulator and the steering unit that would lead to the propulsion unit operating under undesirable operating conditions.

16. A control system according claim 15 wherein the at least one propulsion unit sensor is selected from the group consisting of sensors for the number of revolutions, the temperature, vibrations, clutch position, oil level, cooling water pressure and any two or more of the foregoing conditions.

17. A control system according claim 15 wherein the speed regulator and the steering unit are each manually movable and wherein the limiters are operable so that movement of the speed regulator or the steering unit or of both the speed regulator and the steering unit past certain respective positions is partially impeded so that the operator has to exert more force than normal.

18. A control system according claim 15 wherein the limiters are operable so that movement of the speed regulator or of the steering unit or of both the speed regulator and the steering unit past certain positions leads to more or less vibration of the speed regulator or of the steering unit or of both the speed regulator and the steering unit.

19. A control system according to claim 15 wherein the speed regulator and the steering unit are each manually movable and wherein the limiters are operable so that movement of the speed regulator or the steering unit or of both the speed regulator and the steering unit past certain respective positions is blocked.

20. A control system according to claim 15 wherein the navigational aid comprises a display to display to the operator reasons for determining the forbidden areas.

21. A control system according to claim 15 wherein the navigation aid comprises a display screen to display the surroundings of the waterborne vessel panoramically from a viewpoint above the water level and wherein the forbidden areas, a current position and a future position of the waterborne vessel are indicated in the display of the vessel surroundings.

22. A control system according to claim 21 wherein multiple time-sequenced future vessel positions are indicated in the display of the vessel surroundings.

23. A control system according to claim 21 wherein each waterborne vessel position is indicated by a ship symbol comprising a framework having lateral dimensions corresponding to the breadth of the ship account being taken of the panoramic perspective, while the position of the ship symbol in the display corresponds to the position of the bow of the ship in the surroundings displayed.

24. A control system according to claim 23 wherein the framework comprises two vertical line sections, the distance between the vertical line sections being related to the breadth of the ship.

25. A control system according to claim 24 wherein the top or the bottom or the top and the bottom of each of the vertical line sections connects or connect to a horizontal line section extending toward the other vertical line section in each case.

26. A control system according to claim 21 wherein the display comprises a bar indicating both the actual course of travel and a desired course of travel in suitable units.

27. A control system according to claim 21 wherein the display comprises icons to display alarm signals.

28. A control system according to claim 21 wherein the forbidden areas are displayed on the display screen in a color or colors differing from the color or colors of the remaining areas.

29. A control system according to claim 21 wherein the navigation data is selected from the group consisting of radio navigation data, data output by GPS, LORAN or a DECCA system, geographical position data, radar imaging data, electronic nautical chart data, infra red sensor data, laser sensor data and combinations of any two or more of the foregoing.

30. A control system for controlling a waterborne vessel, the waterborne vessel having:
  a) a propulsion unit for propelling the waterborne vessel through the water; and
  b) a directional device for determining a direction of travel of the waterborne vessel is propelled;
    wherein the control system comprises:
    i) a manually operable speed regulator to regulate the propulsion supplied by the propulsion unit;
    ii) a manually operable steering unit operable to influence the directional device;
    iv) at least one limiter to impede the manual operation of the speed regulator or the steering unit or both the speed regulator and the steering unit;
    v) at least one propulsion unit sensor to provide information concerning the state of the propulsion unit; and
    vi) at least one navigational aid to provide navigation data to an operator of the speed regulator or the steering unit or of both the speed regulator and the steering unit;

and wherein the control system can process the navigation data to identify forbidden areas of travel for the waterborne vessel can process the sensor information to determine undesirable propulsion unit operating conditions and can actuate one or more of said at least one limiters to impede operation of the speed regulator or of the steering unit or of both the speed regulator and the steering unit that would lead to the waterborne vessel moving toward the forbidden areas or would lead to the propulsion unit operating under undesirable operating conditions or would lead to both said forbidden area movement and said undesirable operation.

* * * * *